Aug. 14, 1934. J. C. SHARP 1,969,762
FLOATING HUB LINER
Filed March 3, 1930
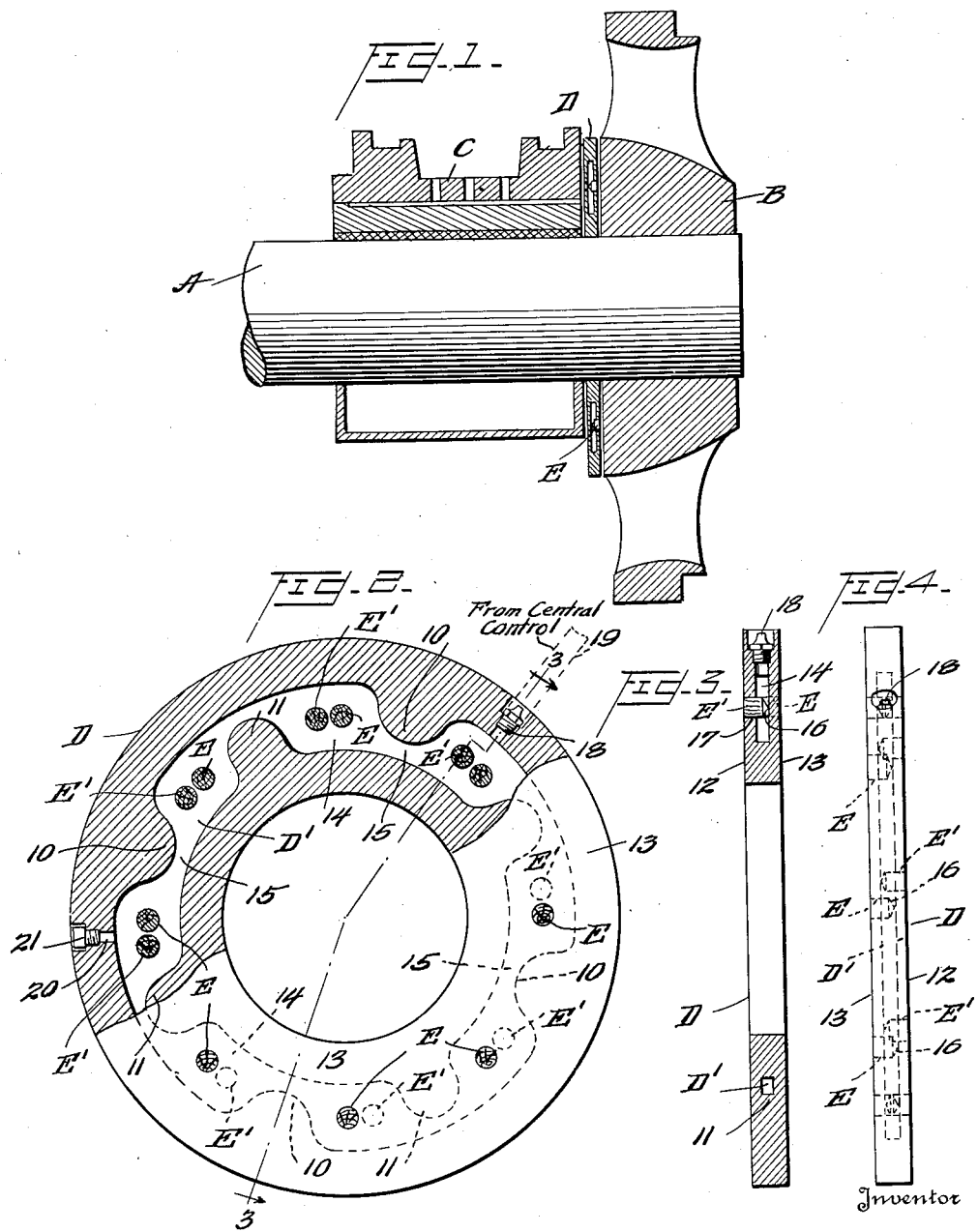
Inventor
John Cessna Sharp
By C. J. Stockman
Attorney Patented Aug. 14, 1934

1,969,762

UNITED STATES PATENT OFFICE 1,969,762

FLOATING HUB LINER

John Cessna Sharp, Chattanooga, Tenn., assignor to Nathan Manufacturing Company, New York, N. Y., a corporation of New York Application March 3, 1930, Serial No. 432,898

6 Claims. (Cl. 308—165)

Government regulations as to the side play permissible between the wheels and the boxes in which their axles are journalled are very rigid and necessitates frequent trips of locomotives whose truck and trailer hubs are lubricated by present methods to the repair-shops for the renewal of liners and for repairs of the wheels and bearing boxes. The practice usually resorted to in engine truck lubrication and in trailer truck lubrication has been to oil the hubs by hand, the oil being poured directly from the engineer's oil can onto the hub liners or into a waste-filled cavity in the box having a drilled hole leading to the hub liner.

While certain other ways of lubricating these parts have been suggested, and have been tested or used to a limited extent, none of them have commended themselves to an extent which promises general adoption, notwithstanding that they may possess certain advantages over hand methods and notwithstanding that railway engineers agree that engine-truck journal lubrication is probably more greatly in need of improvement than any other part of the locomotive.

The instant invention has for its purpose the provision of a washer applicable to the lubrication of engine truck and trailer hubs which will be free from every objection and will possess structural and functional characteristics of a nature to commend the washer to railway engineers as being worthy of universal adoption. Among these characteristics are, (1) simplicity and durability; (2) absence of structural or functional details or parts which would involve any change in the wheel hub or journal box in its installation and operation; (3) capability of supplying oil, freed from sand, grit, or other hard material, for an indefinite length of time to the contacting surfaces to be lubricated, in quantity adequate to eliminate wear of said surfaces and at the same time with great economy in the amount of oil use; and (4) capability of operating automatically and continuously, without calling for any action of the engineer (except to see to it that its reservoir contains oil) and independent of any side play of any of the parts to be lubricated relatively to any other part.

A constructional form of the liner characterized also in that it may be made of brass or copper and yet be capable of withstanding the terrific lateral pressure to which it is subjected in use, is shown in the accompanying drawing, in which:—

Fig. 1 is a sectional view through a part of a locomotive wheel, the journal box and my improved hub liner, and shows the corresponding end of the wheel axle in elevation;

Fig. 2 is a view of the liner partly in section and partly in side elevation;

Fig. 3 is a section on the line 3—3 of Fig. 2; and

Fig. 4 is an edge view of the liner.

A designates the axle of a locomotive truck or trailer, B the hub of a wheel mounted on said axle, C a journal box, or drive box, and D a substantially ring-shaped washer which is interposed between the corresponding surfaces of the journal box and wheel-hub and constitutes the subject of the instant application for patent. This washer is hollow to provide an oil reservoir D' and said reservoir extends throughout the entire interior of the washer. The washer is further provided with oil feeding and conducting plugs, E, E', which extend in opposite directions outward to the side surfaces of the washer and lubricate the latter. It is somewhat loosely mounted on said axle and is free from any rigid connection with its wheel-hub or journal box.

This washer thus has some degree of rotative and lateral movement relatively to said axle and to the wheel-hub and box. In short, it has a floating action and hence, in the particular use herein set forth, it provides a floating hub liner having special means for lubricating purposes. Since it is not rigidly connected to the journal box no change or modification of the latter to adapt it to this floating hub liner is required.

From the reservoir $D^1$ an appropriate number of wooden plugs having certain important characteristics extend to one or both faces of the liner. It is highly desirable that certain of these plugs (marked E) extend to one face and certain others (marked F) to the opposite face, of the liner in order that both faces of the liner may be supplied with oil to act as a lubricant between the same and the wheel hub and journal box respectively—the alternating arrangement thereof indicated in Figs. 2 and 4 being preferred.

The plugs employed by me are of the special nature set forth and claimed in an application for patent filed by me December 11, 1922, and which application matured, during the pendency of the instant application, into Patent No. 1,804,234, dated May 5, 1931. These plugs are characterized by their ability to feed the oil unfailingly in minute quantities and without interruption to the face or faces of the liner and also by their ability to prevent the passage of sand, grit and the like with the oil to the surface to be lubricated and by the absence of liability of any formation of carbon or the like at their ends which are in contact with the part to be lubricated, although formed of wood which in its natural condition contains resins.

Of all woods with which I have experimented those of the, so-called, non-porous (coniferous) group—straight grained white pine being preferred—only will satisfactorily answer my purpose, since porous wood or woody material, as well as those made of wicking and the like, provide relatively large channels through which the oil will feed so rapidly as to call for refilling of the reservoir at such short intervals as to make them not only wasteful of oil but uncertain in the feeding of the oil on long runs, during which the oil originally supplied to the reservoir is used up and interruption of the movement of the train to replenish the supply would be a serious disadvantage. Moreover, the depletion of the oil in the reservoir might well pass unnoticed until the serious consequences now of common occurrence as the result of present lubricating methods have been brought about. It will be noticed in this connection that the capacity of the reservoir is limited by the space available in a liner which must be sufficiently strong to withstand the enormous side thrust to which it is subjected in use and yet must be thin enough to operate in the space between the confronting surfaces of the wheel and hub and journal box.

White pine which, as already stated, I prefer, like other woods of, so-called, non-porous nature, in its natural state is so poor a conductor of oil that plugs formed therefrom are impracticable for my use until the wood or plugs have been subjected to a special treatment by which the ability thereof to attract and feed oil is so increased that the plugs become operative as soon as the liner in which they are installed has been supplied with oil, and will thereafter operate to feed oil continuously and in minute amounts to the surfaces to be lubricated.

The special treatment to which I subject the wood is set forth in my aforesaid copending application (Patent No. 1,804,234, May 5, 1931) and includes the boiling of round strips of wood from which the pegs or plugs are to be formed, or the pegs or plugs themselves, the latter being preferred, in oil of substantially the kind to be later fed by the pegs or plugs. This is continued until the wood has been thoroughly impregnated, or until the wood has been brought to such a condition that it will absorb oil substantially to the point of saturation if submerged in a bath of unheated oil. When the round strips or the plugs are first introduced into the bath of heated oil, the latter becomes agitated. This presumably is caused by expulsion of natural gaseous or liquid materials from the wood. When this agitation subsides, there will have been at least a partial impregnation of the strips or plugs with the lubricating oil. It has been my practice to then continue the treatment in a separate bath of unheated oil to assure thorough impregnation of all the strips or plugs which are capable of such impregnation. This will be demonstrated by the sinking of the strips or plugs to the bottom of the bath. Those which so sink are ready for use while those which persistently float should be discarded, since they have thus demonstrated that entirely satisfactory results cannot be expected therefrom. Moreover, care should be taken in the selection of the wood from which the plugs are to be formed, since the best results call for a close straight grain and even when such care is exercised, it has been found in my practice that strips or plugs even when cut from the same block or piece of wood will vary as to their oil attracting and oil conducting qualities, some absorbing the oil to the point of saturation and sinking, while others resist the absorption of the oil and persistently float.

The plugs which have been thus previously treated with oil may be installed in a floating hub liner or other washer having an oil reservoir, as soon as the impregnation of the wood with the oil is completed, or their installation may be postponed to a later date without detrimentally affecting their operation. They begin to function as soon as their inner end portions are immersed in oil in the reservoir and continue to function automatically and unfailingly as long as there is any oil in the reservoir. They are preserved by the oil and last indefinitely. Moreover, it is particularly noticeable that although white pine and like, so-called non-porous woods in the raw state contain resins and other substances the plugs in use—i. e. after the treatment described—not only have the oil feeding and impurity-resistant or filtering qualities hereinbefore mentioned, but also show no tendency whatever to becoming clogged, or of glazing over, or of the formation of carbon at their oil-discharge ends. They act continuously and unfailingly and call for no attention whatever, the only attention required being to refill the reservoir when the supply of oil therein has been exhausted.

Reverting now to the illustrated construction of the liner, it will be noticed that it is formed with ribs 10 and 11 which extend alternately respectively toward the axis and toward the periphery of the liner. Each of these ribs extends from one face 12 to the other face 13 of the liner and they are so spaced within the liner as to provide oil pockets 14 which are in open communication with each other through ports 15. The purpose of these ribs is to so stiffen the liner that it may withstand the side pressures to which it is subjected in use, even when made of brass or bronze, without calling for an undue thickness of the liner. In this illustrated embodiment two of the oil attracting and conducting plugs E project in opposite directions from each of the oil pockets 14 to the respective surfaces of the liners, and each has its inner surface in contact with the inner surface of the wall opposite that through which its outer end extends and has its said inner end reduced in diameter, as indicated at 16, to enable the oil to enter the same. The outer end of each plug is tightly fitted, under pressure, in an opening 17 provided in the wall of the liner to receive the same and this tight fit together with the contact of its inner end with a wall of the reservoir, prevents its displacement in use.

It is preferred to supply the reservoir D' with oil through a fitting having a valve which is opened under a predetermined pressure. Such a fitting is indicated at 18, the one indicated being of a type, known as the Zerk, which being known requires no detailed description or illustration, especially since any suitable pressure operated fitting may be employed. A means of such nature lends itself admirably to the use of a centralized control system by which oil is replenished in the reservoirs in all the liners at the same time, and, if desired, when it is supplied to other parts of the locomotives equipped with oiling systems having means for control located at a common control point. A pipe 19 designated "From central control" is shown in Fig. 2 to indicate this. In these systems, it is possible to produce an enormous pressure within the liner reservoirs which might, unless corrected, be sufficient to force the oil attracting and conducting plugs E out of their respective seats, notwithstanding the latter are inserted tightly and under pressure. To obviate this possibility, a vent port 20 having a vent valve 21 is provided. This valve may be any suitable construction adapted to open at a predetermined pressure below that calculated at which said plugs would be loosened. Any air which is entrapped in the reservoir may be vented through the plugs when the oil is supplied under heavy pressure, and otherwise may be vented through the port 20 having a closure valve to open at low pressure; it being understood that if a pressure system be not employed the air may not escape through the plugs during refilling operations.

It will be evident that the washer herein described possesses many qualities hereinbefore stated which particularly adapt it for use as a floating liner for locomotive engine truck hub and trailer hub lubrication, and that in such use it presents important advantages over the methods, or means, which are now in use or have been suggested for the lubrication of engine truck and trailer hubs.

Having thus described the invention, what I believe to be new and desire to secure by Letters Patent, is:—

1. A washer applicable for use as a floating hub liner for engine truck hub and trailer lubrication comprising a hollow body member having spaced internal ribs extending from one of its sides to the other and each provided with a port, and a plurality of oil attracting and conducting elements respectively extending to a surface of the washer from corresponding spaces between the ribs, each of said elements formed to conduct oil automatically in minute amounts and substantially continuously and to prevent the passage of sand, grit and the like, to said surface.

2. A washer applicable for use as a floating hub liner for engine truck hub and trailer lubrication comprising a hollow body member having internal ribs extending from one of its sides to the other and each provided with a port, to thereby form a plurality of connected oil pockets, and a pair of rigid oil attracting and conducting elements respectively extending through opposite side walls of the washer from each of said pockets, each of said elements being formed to conduct oil automatically in minute amounts and substantially continuously to the corresponding outer surface of the washer and to prevent the passage of sand, grit and the like to said surface.

3. A floating hub liner comprising a hollow substantially ring-shaped body member formed with internal ribs extending from one of its sides to the other and each provided with a port, to thereby form a plurality of connected oil pockets within said body, and oil attracting and conducting elements extending from said pockets and through the opposite side walls of the body member; said body member having a substantially continuous inner peripheral portion which is of somewhat greater diameter than the shaft upon which it is to be mounted.

4. In a locomotive truck or trailer lubrication the combination with an axle, journal or drive box and wheel, of a ring-shaped washer which is loosely mounted on said axle between the journal or drive box and the hub of the wheel and is free from attachment to said box and wheel, said washer thereby forming a floating hub liner and being formed to provide an oil reservoir extending throughout its entire interior and provided with rigid oil attracting and conducting plugs which extend from said reservoir to the outer surfaces of the washer and are characterized by their ability to conduct oil automatically in minute quantities and substantially continuously to the corresponding surface of the washer and to prevent the passage of sand, grit and the like to said surfaces.

5. A substantially ring-shaped washer applicable for use as a floating hub liner for engine truck hub and trailer lubrication, said washer having a substantially continuous inner peripheral surface of somewhat greater diameter than the axle upon which it is to be mounted and being free from any elements for attaching it to said axle or to any parts with which it is to be operatively associated, whereby it is capable of floating with respect to said axle and parts, and being formed with an oil reservoir which extends throughout its interior and provided with a plurality of oil attracting and conducting plugs which extend from said reservoir to the outer side surfaces of the washer and are characterized by their ability to attract and conduct the oil automatically in minute quantities and substantially continuously to the corresponding surfaces of the washer and to prevent the passage of sand, grit and the like to said surfaces.

6. A substantially ring-shaped washer applicable for use as a floating hub liner for engine truck and trailer lubrication, said washer having a substantially continuous inner peripheral surface of somewhat greater diameter than the shaft upon which it is to be mounted and being free from any elements for attaching it to said axle or to any parts with which it is to be operatively associated, whereby it is capable of floating with respect to said axle and parts, and being formed with an oil reservoir which extends throughout its interior and provided with a pressure fitting for the inlet of oil to the reservoir and with a vent for the escape of air from the reservoir, said vent being arranged to open automatically at a predetermined pressure, and a plurality of rigid oil attracting and conducting plugs whose inner ends are immersed in the oil in the reservoir and whose outer ends are substantially flush with the side surfaces of the washer and are tightly fitted in said surfaces, said air vent being arranged to open under a pressure which is ineffective to disturb the connection of said plugs with the walls of the washer.

JOHN CESSNA SHARP.